(12) United States Patent
Vandenborre

(10) Patent No.: US 6,554,978 B1
(45) Date of Patent: Apr. 29, 2003

(54) HIGH PRESSURE ELECTROLYZER MODULE

(75) Inventor: Hugo Vandenborre, Kasterlee (BE)

(73) Assignee: Vandenborre Technologies NV (BE)

( * ) Notice: Subject to any disclaimer, the term of this patent is extended or adjusted under 35 U.S.C. 154(b) by 0 days.

(21) Appl. No.: 09/807,456
(22) PCT Filed: Oct. 8, 1999
(86) PCT No.: PCT/EP99/07778
§ 371 (c)(1), (2), (4) Date: Jun. 1, 2001
(87) PCT Pub. No.: WO00/22191
PCT Pub. Date: Apr. 20, 2000

(30) Foreign Application Priority Data

Oct. 12, 1998 (EP) .............................. 98203415

(51) Int. Cl.$^7$ ................................ C25B 9/00
(52) U.S. Cl. ................ 204/258; 204/270; 204/279
(58) Field of Search ................ 204/268, 269, 204/270, 253–258, 279, 267

(56) References Cited

U.S. PATENT DOCUMENTS

| | | | |
|---|---|---|---|
| 4,415,424 A | | 11/1983 | Pere |
| 4,698,143 A | * | 10/1987 | Morris et al. ............. 204/253 |
| 5,139,635 A | | 8/1992 | Signorini |
| 5,837,110 A | * | 11/1998 | Dean ........................ 204/240 |

FOREIGN PATENT DOCUMENTS

| | | |
|---|---|---|
| DE | 869941 | 3/1953 |
| EP | 0 056 759 | 1/1982 |
| EP | 0 232 923 | 8/1987 |
| WO | WO 84/03523 | 9/1984 |
| WO | WO 94/00620 | 1/1994 |
| WO | WO 95/17771 | 6/1995 |
| WO | WO 97/00979 | 1/1997 |
| WO | WO 97/24778 | 7/1997 |

* cited by examiner

*Primary Examiner*—Donald R. Valentine
(74) *Attorney, Agent, or Firm*—Woodbridge & Associates, P.C.; Richard C. Woodbridge, Esq.

(57) ABSTRACT

A high pressure electrolyzer as represented in the figure, having a number of electrolysis chambers being held in frame (1), being separated by membrane (2) to which the electrodes (3) are pressed. The electrodes are electrically connected to the bipolar plate (4) with a metal woven sheet (5). The frame has the larger conduit openings (7) on the top side and (8) on the bottom side. Conduit openings (7) evacuate the gas that is generated and openings (8) form a supply channel of electrolyte. Opening (7) is connected to the electrolyzer module's inner space with the small connecting conduit (9) and similarly opening (8) is connected to the inner space via small connecting conduit (10). A ring shaped frame having conduit openings for the supply of electrolyte and the removal of the gasses that are generated and further having a connecting surface with concentric elevations and depressions.

9 Claims, 3 Drawing Sheets

HIGH PRESSURE ELECTROLYZER MODULE

The present invention concerns a high pressure electrolyser module of the filter-press type for the electrolytic production of gasses and further concerns an electrolyser comprising said module.

Electrolysers of the filter-press type comprise a so-called electrolyser module and a number of peripheric items such as degassing chambers, a water supply unit and possibly a transformer/rectifier and the necessary piping to connect the various parts of the electrolyser. An electrolyser module comprises a series of stacked electrolysis chambers, alternately cathodic and anodic. Each chamber holds either one or more anodes or cathodes. The electrolysis chambers are separated from one another by selectively permeable membranes or diaphragms. A combination of a cathodic and an anodic chamber form an electrolysis cell. In each chamber, the electrodes are mounted vertically, preferably in close contact with the membranes. This can be accomplished, for example, by pressing the membrane between the electrodes. Membranes that are particularly suited for this purpose have been described in EP-A-0 232 923.

The electrolysis chambers are hold together by a frame which forms the outer wall of the electrolyser and may take a variety of shapes, polygonal, eg. square, rectangular, or circular. In the latter instance the frame is in fact ring or cylinder shaped. The separating membrane is fixed to the frame together with the electrodes. The frames are made of a material that is inert to the electrolyte and can be made for example of metal, covered by a suitable non-conducting layer, or can be made of a suitable inert non-conducting material such as synthetic. A frame made of metal covered by a flexible vulcanizable material is known from WO-97/00979.

In each electrolysis chamber the electrodes have to be linked by a suitable conductor. In a particular embodiment this can be accomplished by contacting the electrode with a metal woven sheet which in turn is contacted with a metal plate that is mounted in the frame, said plate being referred to in the art as bipolar plate.

The gas that is generated is lead to a degassing chamber, usually placed above the electrolyser unit, where the gas is collected and separated off the electrolyte entrained with the gas. The de-gassed electrolyte is recycled back to the electrolysis chambers and the gas that is collected can be pressurized and stored in suitable pressure tanks. The electrolysis chambers may be connected to outer tubes leading to or coming from the de-gassing chamber for respectively the circulation of the generated gasses or of electrolyte.

Or the electrolysis chamber frames may have suitable conduits at their top side and at their bottom side. The top conduit is meant to evacuate the gas-electrolyte mixture that is generated during electrolysis and the bottom conduit allows the entrance of electrolyte. The gas-electrolyte mixture that is generated is pumped though the upper conduit to a tube leading to the de-gassing unit from which the de-gassed electrolyte is pumped back to the bottom conduit in the fame from which it enters the electrolysis chambers.

Filter-press electrolysers have been described in EP-A-137,936 and in EP-A-56,759. U.S. Pat. No. 5,139,635 for example describes gas electrolysers of the filter-press type comprising a vertical stack of electrolysis chambers connected to a degassing chamber.

Hence the art-known gas electrolysers of the filter-press type are complex arrangements involving several peripheral items such as pumps, tanks and piping, and therefore comprise a multitude of moving parts, requiring supervision, checking and maintenance. Thus, a more simplified arrangement with no or fewer moving parts would be a desirable goal to achieve in that it would require almost no or limited maintenance.

The high pressure electrolysers according to the present invention aim at avoiding moving parts and at the same time allowing the elimination of peripheral equipment resulting in a more simplified arrangement of the electrolyser, requiring less supervision and maintenance.

The present invention concerns an electrolyser which functions under high pressure thus yielding gasses that are under increased pressure and that can be stored directly, without the extra step of compressing. In a further aspect, the electrolysers according to the present invention allow circulation of the electrolyte in the electrolysers and the degassing chamber by spontaneous convection, i.e. without pumping. In still a further aspect, there is provided a supply system to replace the water that is consumed during the course of the electrolysis with minimal moving parts using the pressure of the gas that is liberated in the electrolyser module as driving force.

In addition to the above-mentioned advantages, the high pressure electrolysers of the invention can be allowed to cool to room temperature when they are not functioning. Art-known electrolysers typically function at elevated temperatures e.g. at 70° C., and show leakage when allowed to cool. Consequently, even when out of function, they have to be kept at this elevated temperature.

Thus in one aspect, the present invention is concerned with a high pressure electolyser module comprising a series of stacked electrolysis chambers and each chamber being held within two ring-shaped holding frames, said frames having openings that form conduits for the supply of electrolyte and the removal of gas that is generated, wherein (1) the connecting surface of the ring-shaped frame has one or more elevations and/or one or more depressions in such manner that an elevation of a ring fits in a depression of a neighboring ring;

(2) a gasket is placed in between said elevation in a particular ring and said depression of a neighboring ring;

(3) the distance between the rim of said conduit and the outer wall of the opening forming the gas or electrolyte conduit, and the outer wall of the ring-shaped fine is such that the material can endure a pressure gradient of at least 200 bar.

In a further aspect the invention concerns an electrolyser comprising an electrolyser module as described herein.

The gasses that are generated in the electrolyser module contain electrolyte and typically a gas/electrolyte mixture is generated in the module usually forming a foam mixture. This is lead to a degassing chamber where gas and electrolyte are separated. As used herein, the term gas that is generated and similar terms, when used in relation to gas that is generated in the electrolyser module until it is separated in the degassing chambers, is meant to comprise the afore mentioned gas/electrolyte mixture.

The electrolysis clambers in the high-pressure electrolyser modules according to the invention contain one or more, preferably two electrodes placed vertically in the chamber. The electrodes are made of art-known materials that are inert to the electrolyte. The chambers arm separated by a semipermeable membrane or diaphragm and where two electrodes per chamber are used, the electrodes are preferably pressed against the membrane or diaphragm and connected by a suitable conductor. In a preferred arrangement, a bipolar plate is placed between the two electrodes and electric contact is made by placing two metallic woven sheets between each electrode.

The various parts of each electrolysis chamber are held in a ring-shaped frame that forms the outer wall of the electrolysis chamber. The shape and dimensions of this frame are essential features to assure high pressure electrolysis on the one hand and spontaneous convection of the electrolyte on the other.

In a particular embodiment, the electrolysis chambers are placed between two flanges, preferably made of metal, mounted at each side of the stack of electrolysis chambers. The flanges are hold together with several tie rods placed at the outside of the electrolyser module and linking the flanges fitted with holds to turn tight to press the electrolysis chambers together.

In a further aspect, the present invention provides a ring-shaped frame wherein the connecting surface of said ring has one or more elevations and/or one or more depressions in such manner that an elevation of a ring fits in a depression of a neighboring ring and the ring has at least two cylindrical shaped openings, at least one at the bottom and at least one at the top side the distance between the rim of said conduit and the outer wall of the opening forming the gas or electrolyte conduit, and the outer wall of the ring-shaped fame is that the material can endure a pressure gradient of it least 200 bar, in particular said distance being at least 1.5 cm.

The term connecting surface as used herein refers to the flat surface of the ring, having one or more elevations as described hereinafter, by which a particular ring-shaped frame is contacted with a neighbouring ring.

The ring shaped frame has a thickness (i.e. distance between the two connecting surfaces of the ring) in the range of 0.2 to 1.5 cm, in particular of 0.4 to 1.0 cm, preferably about 5 or about 6 mm.

The inner diameter of the ring may vary depending on the desired volume of the electrolysis chamber and hence the scale of the electrolysis process. In a standard electrolyser module for industrial application the inner diameter may vary between 10 and 100 cm, preferably between 20 and 40 cm. A typical inner diameter for example is 30 cm. The inner size of the ring often is expressed in terms of sure, i.e. the surface circumscribed by the inner circle of the ring. Expressed in this manner, particular inner sizes may vary between 300 and 5000 cm2, more in particular between 1000 and 3000 cm2, or between 1000 and 2500 cm2, e.g. about 2000 or about 3000 cm2.

The distance between the outer and inner rim of the ring shaped frame, i.e. the outer diameter minus the inner diameter may vary, and should at least be about 5 cm, more in particular at least about 7 cm, e.g. about 10 cm. The outer diameter of the ring depends on the aforementioned dimensions of the inner diameter and the size and positioning of the ring openings.

The connecting surface of the ring shaped frames of the invention may have one elevation or several such elevations preferably positioned in a concentric manner, wheareas a neighboring ring may contain one or more equally-sized and shaped depressions so that an elevation fits into a depression of a neighboring ring. Or a particular ring may have at one connecting surface one or more elevations and at the other surface one or more depressions. In another embodiment, a connecting surface may contain as well one or more elevations as depressions.

The elevations and depressions may be of various shape, for example block-shaped (i.e. square or rectangular) or triangular. The latter shape is preferred. In a particularly preferred embodiment the connecting surface of the ring-shaped frame has a series of small elevations and depressions giving the surface a milled aspect, the elevations and depressions having a triangular shape, whereby a cross-section of the surface has a saw-tooth aspect. The distance each elevation (and hence between each depression) may vary but in the aforementioned particularly preferred embodiment is in the range of 0.5 to 3 mm, e.g. about 1 mm and the distance between the top of an elevation and the bottom of a depression is in the range high of 0.5 to 3 mm.

Preferably, the elevations/depressions cover about the whole surface of the ring, except for a small section at the outer and inner rims of the ring, in particular ending at at least 2 or 3 mm from the ring's edge.

In a particularly preferred embodiment, a series of elevations/depressions is positioned concentric around the conduit openings. This embodiment allows an even more effective closure of the rings. The distance of the outer circle circumscribing the surface covered by these concentric elevations/depressions, and the outer rim of the conduit opening is about half the diameter of the conduit opening.

The ring-shaped frames are made of a suitable polymeric material that is inert to the electrolyte, and preferably is a thermoplastic material such as polyphenylene sulphide, polyphenylene oxide and the like and in particular polysulphone. These rings are manufactured by conventional molding techniques.

In order to assure a better contact use is made of a suitable gasket. The latter may be a flat type or O type ring and is made of a suitable material, inert to the used electrolyte. In particular, the gasket is a flat ring made of synthetic and is pressed between the milled surfaces of two neighboring frames. Such ring-shaped flat gasket preferably is made of a suitable elastic and inert polymeric material such as polytertrafluoroethylene and has a uniform thickness in the range of 0.2 to 1 mm, preferably about 0.5 mm. It preferably is sized equal to, or slightly smaller than the flat surface of the ring-shaped frame. In the latter instance the gasket's outer side lies within a small distance of the outer side of the frame, for example 2 mm. Preferably the flat gasket covers the surface formed by the elevations/depressions in the ring.

The distance between the outer wall of the ring frame and the rim of the openings forming gas or electrolyte conduits is critical and should be such that the section of the ring covered by said distance can endure the pressure gradient between the inner space of the electrolyser module and the atmospheric pressure outside the electrolyser module. In particular said distance is at least 1.5 cm, more particularly at least 2 cm or at least 3 cm. In the instance where the electrolyser functions at about 200 bar a distance of about 2 cm proved out to be effective.

The ring-shaped frame has at least three openings, two at the upper end to remove the gasses that are generated and at least one, but preferably two, at the bottom side serving as supply conduit of electrolyte. Preferably, there are four openings, two at the top and two at the bottom side, the center of each opening being located on an imaginary circle concentric to the ring's inner and outer rim, and the openings being positioned symmetrically.

The conduit openings are circular shaped having a diameter in the range of from 1.0 cm to 3.0 cm, in particular in the range of from 1.5 cm to 2.5 cm, for example about 2.0 cm.

In a particular embodiment, each ring-shaped ring has two upper openings and two bottom openings. The top openings serve as conduits to remove the gasses that are liberated at the cathode and respectively the anode, e.g. in the case of electrolysis of water, hydrogen and respectively oxygen. The bottom openings serve as a conduit for the supply of electrolyte, either fresh or de-gassed arriving from the de-gassing chamber. The ring-shaped rings are stacked in such manner that all openings fit precisely on one another thus forming a channel which passes through the whole of the electolyser module.

In each ring, one top and one bottom opening is connect to the electrolysis chamber via a small cylindrically shaped connecting conduit. Said connecting conduits should preferably have a small diameter, e.g. in the range of from 0.5 to 5 mm, more particularly from 0.5 to 3 mm, for example 1 or 2 mm. In particular the diameter of the connecting conduit for electrolyte should be larger than that of the connecting conduit for removal of gasses. In a particular embodiment the diameter of the said conduits is about 1 mm for the gas conduits and about 2 mm for the electrolyte conduits. The length of said connecting conduits may be in the range of from 1 cm to 4 cm, in particular from 2 cm to 3 cm, e.g. 2.5 cm.

In a particular embodiment, a ring-shaped frame has two top openings of which one is connected to the inner rim of the ring and two bottom of which one is connected to the inner rim of the ring, the openings being positioned symmetrically on the ring and wherein the opening having the small conduit connection are positioned at the same half of the ring. This particular embodiment of the ring allows stacking with only this ring type.

When the openings in the ring frame are shaped and positioned in the manner described above, quite unexpectedly it quite unexpectedly has been found that the electrolyte-gas mixture is circulated in the electrolyser module and de-gassing unit by spontaneous convection, i.e. without the help of a pumping system.

The high pressure electrolysers modules according to the present invention can resist high pressures as high as 200 Bar, even up to 300 Bar. Pressures typically used to compress gasses such as hydrogen or oxygen, e.g. 200 Bar are quite feasible. This allows electrolysis under increased pressure whereby the gasses that are produced need not be compressed. This allows a more simple arrangement in that on the one hand a gas compressor and on the other a pump needed to circulate the electrolyte can be omitted.

In still a further aspect, there is provided a high pressure electrolyser according to the invention, having a water-supply system, placed above a degassing chamber, comprising a vessel having an inlet for water and an inlet for pressurized gas that is tapped from one of the degassing units, and an outlet for water brought at high pressure into a pipe that is connected to one of the de-gassing chambers. The water-supply system has minimal moving parts and is placed above the electrolyser module, in particular above the degassing units. It comprises a vessel preferably made of metal and capable of resisting the pressure at which the electrolyser functions, having an inlet for water and an inlet for pressurized gas that is tapped from one of the degassing units. Water is allowed to enter the said vessel, e.g. by a suitable tap, and subsequently pressurized gas is entered. In this manner the water brought at high pressure and subsequently this water is allowed to leave the vessel, e.g. by a tap, into a pipe that is connected to one of the de-gassers, the water flowing into the de-gasser by gravity. The present system is simple, requiring no additional pumps thereby avoiding moving parts. The taps can be controlled manually or their functioning can be automated.

In a preferred embodiment, in case of electrolysis of water, use is made of the pressurized oxygen that is separated in the oxygen degassing unit and the water-supply system is connected to the oxygen separating chamber.

The present electrolysers can be used in the production of various gasses, for example chlorine by the electrolysis of brine, or oxygen and hydrogen in case of the electrolysis of water.

The following is a detailed description of the drawings meant to illustrate the invention and not to limit it thereto.

Figure 1:
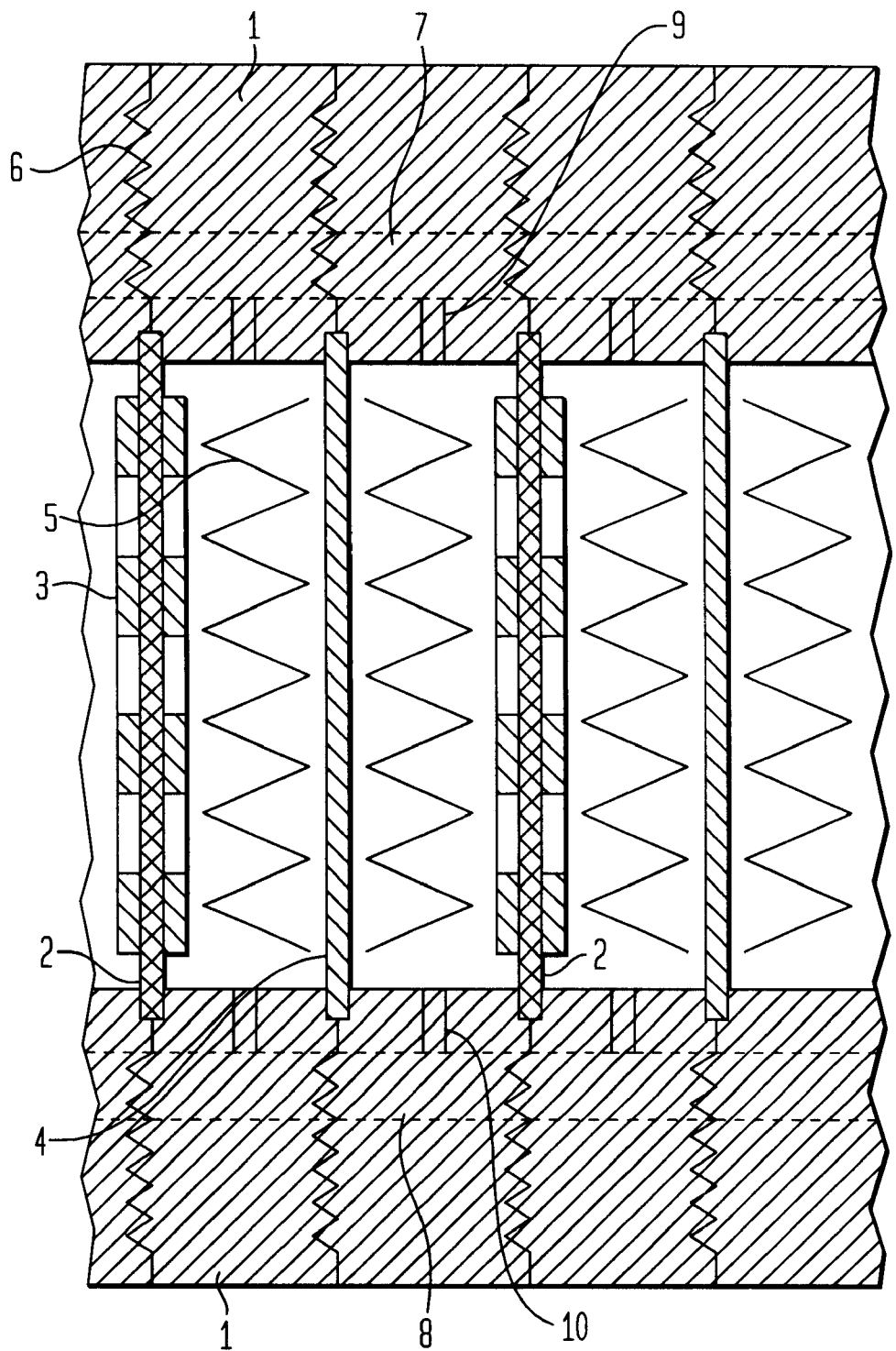
FIG. 1 shows a cross-section of a high pressure electrolyser module according to the present invention.

FIG. 1 shows a cross section of a number of electrolysis chambers being held in frame 1, being separated by membrane 2 to which the electrodes 3 are pressed. The electrodes are electrically connected to the bipolar plate 4 with a metal woven sheet 5. The frame has the larger conduit openings 7 on the top side and 8 on the bottom side. Conduit openings 7 evacuate the gas that is generated and openings 8 form a supply channel of electrolyte. Opening 7 is connected to the electrolyser module's inner space with the small connecting conduit 9 and similarly opening 8 is connected to the inner space via small connecting conduit 10.

Figure 2:
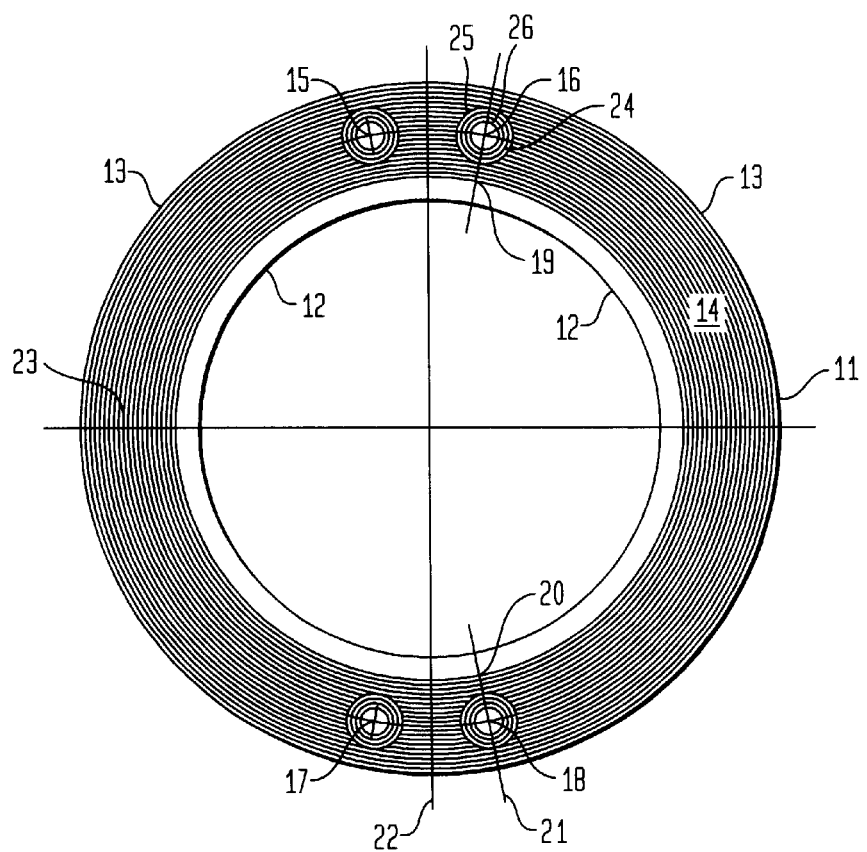
FIG. 2 is a front view of a ring-shaped frame according to the present invention.

A front view of the ring-shaped frame according to the present invention is shown in FIG. 2, with the connecting surface 11, the inner rim 12 and the outer rim 13, the milled surface 14 and the top conduit openings 15 and 16; and the bottom conduit openings 17 and 18. In this embodiment, only top opening 16 is connected to the inner opening of the ring-shaped frame and hence to the electrolysis chamber by connecting conduit 19, and similarly is opening 18 connected to the electrolysis chamber by connecting conduit 20. The centers of the four ring openings are located on concentric circle 23. Axis 21 crosses the center of the ring-shaped frame, said center also being located on the crossing of intersecting axes 22. The milled surface concentric to the ring openings 15, 16, 17 and 18 is represented by 24, the surface of the latter milled surface depending upon the distance between the outer rim 26 of the opening and the outer rim 25 of the concentric milled surface 24.

Figure 3:
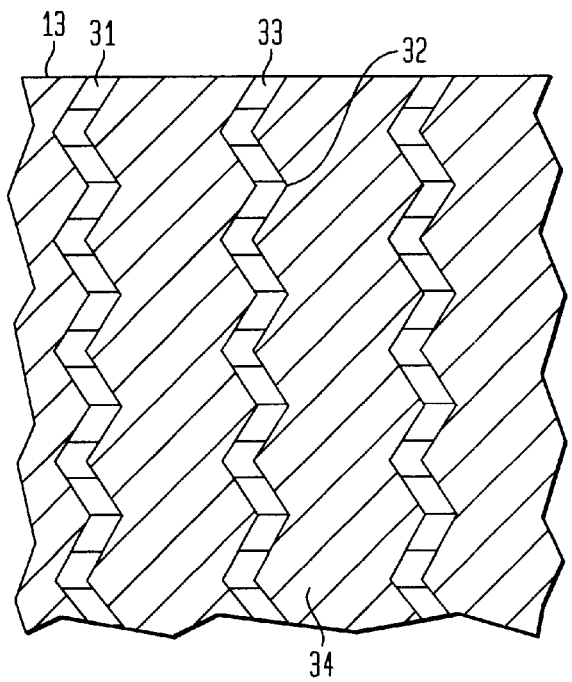
FIG. 3 shows a cross section of the ring-shaped frame.

FIG. 3 shows a cross-section of the outer section of a number of ring-shaped frames 34 with the milled surface 14 and the elevations 33 and depressions 32 giving the cross-section of the ring a saw-tooth aspect. 13 is the outer rim of the ring and 31 is the gasket.

Figure 4:
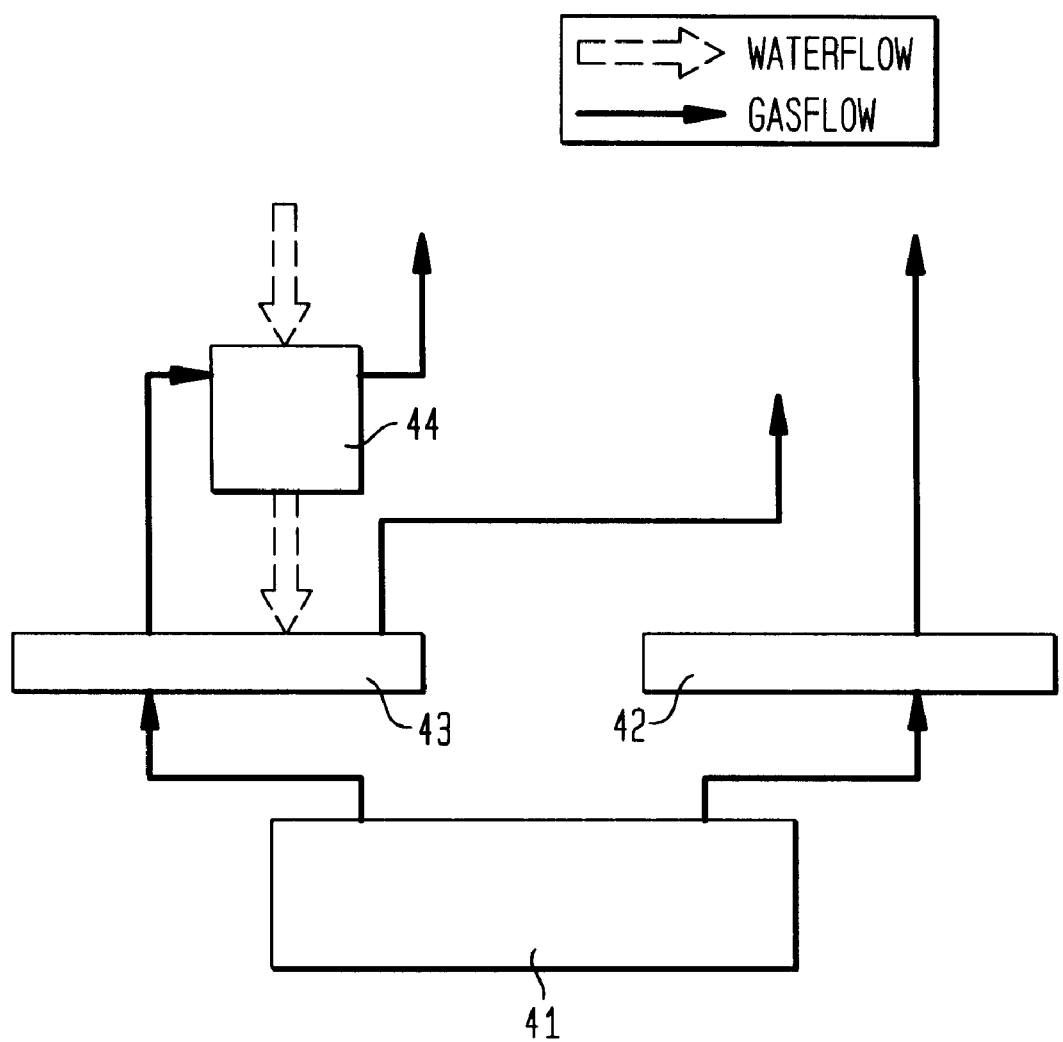
FIG. 4 shows a schematic representation of an electrolyser with two degassing chambers and a water supply system.

FIG. 4 shows a schematic representation of the major part of a high pressure electrolyser according to the invention, wherein 41 represents the electolyser module with the higher-placed degassing chambers 43 and 44 and the still higher placed water-supply system 44. The gas/electrolyte mixture that is generated in electrolyser module 41 is lead to degassing chambers 43 and 44. One of said de-gassing chambers, in particular the oxygen degassing chamber in case of electrolysis of water, is connected to a water-supply system 44, wherein water is pressurized with the oxygen gas coming from chamber 43. Pressured water of 44 is lead into chamber 43 by gravity, hence no extra pump is required to supply fresh water.

What is claimed is:

1. A high pressure electrolyser module comprising a series of stacked electrolysis chambers, each chamber being held within a first and a second ring-shaped holding frame, and each of said ring-shaped holding frames having an outer wall and an inner wall and a first and a second connecting surface, such that said second connecting surface of said first ring-shaped holding frame and said first connecting surface of said second ring-shaped holding frame are adjacent connecting surfaces, each of said ring-shaped holding frames further having circular shaped openings that form conduits for the supply of electrolyte and the removal of gas that is generated, wherein (1) said connecting surfaces of said ring-shaped frames have one or more elevations and/or one or more depressions in such a manner that in said adjacent connecting surfaces, said elevations fit in said depressions;

(2) a flat gasket is placed between said adjacent connecting surfaces;

(3) the distance between said outer wall and said circular shaped openings forming gas or electrolyte conduits is at least 1.5 cm;

(4) the diameter of said conduits is in the range of from 1 cm to 3 cm.

2. An electrolyser module according to claim 1 wherein the distance between said outer wall and said openings forming gas or electrolyte conduits is at least 2 cm.

3. An electrolyser module according to claim 1 wherein the diameter of said conduit is in the range of from 1.5 cm to 2.5 cm.

4. An electolyser module according to claim 1 having a cylindrically shaped connecting conduit between said inner wall of said ring-shaped holding frame and said circular shaped openings forming gas or electrolyte conduits, wherein said cylindrically shaped connecting conduit has a diameter in the range of from 0.5 mm to 3 mm and a length in the range 1 cm to 4 cm.

5. An electrolyser module according to claim 1 wherein the flat gasket has a thickness in the range of from 0.2 mm to 1 mm and is made of polytetrafluoroethylene.

6. An electrolyser comprising an electrolyser module according to claim 1 and further having a water-supply system, placed above a degassing chamber, comprising a vessel having an inlet for water and an inlet for pressurized gas that is tapped from one of the degassing units, and an outlet for water brought at high pressure into a pipe that is connected to one of the de-gassing chambers.

7. An electrolyser according to claim 6 wherein the water-supply system is placed above the oxygen de-gassing chamber and the pressured gas is tapped from the oxygen de-gassing chamber.

8. A ring-shaped holding frame, for a high pressure electrolyser, said ring-shaped holding frame having an outer wall and an inner wall, and a first and second connecting surface, wherein (1) each of said connecting surfaces has one or more elevations and/or one or more depressions in such a manner that said elevations on said first connecting surface correspond to said depressions of said second connecting surface and vice versa;

(2) the ring has at least two circular shaped openings forming gas or electrolyte conduits, at least one at the bottom and at least one at the top;

(3) the distance between said outer wall and said circular shaped openings forming gas or electrolyte conduits is at least 1.5 cm;

(4) the diameter of said circular shaped openings forming gas or electrolyte conduits is in the range of from 1 cm to 3 cm.

9. A ring-shaped frame according to claim 8 wherein the distance between said said circular shaped openings forming gas or electrical conduits and said outer wall of said ring-shaped frame is at least 1.5 cm.

* * * * *